US010520326B2

(12) United States Patent
Sun et al.

(10) Patent No.: US 10,520,326 B2
(45) Date of Patent: Dec. 31, 2019

(54) DRIVING ROUTE MATCHING METHOD AND APPARATUS, AND STORAGE MEDIUM

(71) Applicant: Baidu Online Network Technology (Beijing) Co., Ltd., Beijing (CN)

(72) Inventors: Xiaoyang Sun, Beijing (CN); Wu Yang, Beijing (CN); Yu Zhi, Beijing (CN); Changcheng Zhou, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 168 days.

(21) Appl. No.: 15/512,345

(22) PCT Filed: Nov. 23, 2015

(86) PCT No.: PCT/CN2015/095267
§ 371 (c)(1),
(2) Date: Mar. 17, 2017

(87) PCT Pub. No.: WO2017/000487
PCT Pub. Date: Jan. 5, 2017

(65) Prior Publication Data
US 2017/0276499 A1    Sep. 28, 2017

(30) Foreign Application Priority Data

Jun. 30, 2015    (CN) .......................... 2015 1 0377019

(51) Int. Cl.
*G01C 21/00*    (2006.01)
*G01C 21/34*    (2006.01)
(Continued)

(52) U.S. Cl.
CPC ..... *G01C 21/3438* (2013.01); *G01C 21/3605* (2013.01); *G06F 16/2255* (2019.01);
(Continued)

(58) Field of Classification Search
CPC . G01C 21/3438; G01C 21/3605; G06F 16/29; G06F 16/9537; G06F 16/2255; G06Q 10/047; G06Q 50/30
See application file for complete search history.

(56) References Cited

U.S. PATENT DOCUMENTS 5,938,720 A * 8/1999 Tamai ................ G01C 21/3446
701/411
2002/0011940 A1 1/2002 Cappel
(Continued)

FOREIGN PATENT DOCUMENTS

| CN | 101216913 A | 7/2008 |
| CN | 102722491 A | 10/2012 |

(Continued)

OTHER PUBLICATIONS

International Search Report corresponding to International Patent Application No. PCT/CN2015/095267, State Intellectual Property Office of the P.R. China, dated Feb. 24, 2016; (2 pages).
(Continued)

*Primary Examiner* — Ian Jen
(74) *Attorney, Agent, or Firm* — Nixon Peabody LLP (57) ABSTRACT

A driving route matching method, apparatus, and storage medium. The method includes: obtaining a route to be retrieved, the route including a retrieval start point and a retrieval end point; performing a search in a database of existing routes, and selecting the existing routes passing through grids within a predetermined range around the start point as routes available for the start point; performing a search in the database of the existing routes, and selecting the existing routes passing through grids within a predetermined range around the search endpoint as routes available for the end point; calculating intersections of the routes available for the start point and the routes available for the end point, and using the routes in the intersections as candidate routes; and screening the candidate routes according to detouring distances. The driving route matching method and apparatus enable a remarkable improvement in the efficiency of driving route matching.

20 Claims, 5 Drawing Sheets

(51) Int. Cl.
*G06F 16/29* (2019.01)
*G06F 16/22* (2019.01)
*G06F 16/9537* (2019.01)
*G01C 21/36* (2006.01)
*G06Q 10/04* (2012.01)
*G06Q 50/30* (2012.01)

(52) U.S. Cl.
CPC .......... *G06F 16/29* (2019.01); *G06F 16/9537* (2019.01); *G06Q 10/047* (2013.01); *G06Q 50/30* (2013.01)

(56) References Cited

U.S. PATENT DOCUMENTS

| | | | |
|---|---|---|---|
| 2005/0085997 A1 | 4/2005 | Park | |
| 2007/0276595 A1 | 11/2007 | Lewinson et al. | |
| 2008/0270019 A1* | 10/2008 | Anderson | G01C 21/3438 701/533 |
| 2010/0207812 A1 | 8/2010 | Demirdjian et al. | |
| 2012/0281017 A1* | 11/2012 | Seegers | G01C 21/206 345/629 |
| 2013/0096827 A1 | 4/2013 | McCall et al. | |

FOREIGN PATENT DOCUMENTS

| | | |
|---|---|---|
| CN | 103544291 A | 1/2014 |
| CN | 103808325 A | 5/2014 |
| CN | 104268147 A | 1/2015 |
| CN | 104731963 A | 6/2015 |
| CN | 104978420 A | 10/2015 |
| JP | 2015069302 A | 4/2015 |
| KR | 10-2010-0053717 | 5/2010 |
| WO | 2015006769 A1 | 1/2015 |

OTHER PUBLICATIONS

European Search Report for Application No. EP 15897014.5, dated Feb. 27, 2019 (9 pages).

Drews, F. et al.; "Multi-Hop Ride Sharing"; Proceedings of Sixth Int'l. Symposium on Combinatorial Search; Dec. 31, 2013; retrieved from <https://pdfs.semanticscholar.org/1056/8e8b6dad5b3bedf05b4ca479daa43b16f2ca.pdf> (9 pages).

* cited by examiner

DRIVING ROUTE MATCHING METHOD AND APPARATUS, AND STORAGE MEDIUM

CROSS-REFERENCE TO RELATED APPLICATION

This application is a U.S. National Stage of International Application No. PCT/CN2015/095267, filed Nov. 23, 2015, which is related to and claims priority from Chinese Application No. 201510377019.2, filed on Jun. 30, 2015, entitled "Driving Route Matching Method and Apparatus," the entire disclosures of which are hereby incorporated by reference in their entireties.

TECHNICAL FIELD

Embodiments of the present invention relate to the field of location-based services, and more particularly to a driving route matching method and apparatus, and a storage medium.

BACKGROUND

The Internet has entered a steady development phase in China when the concept of ride sharing was introduced to the country. Therefore, since the very beginning, most people can find ride sharing partners from ride sharing websites. As the Internet develops, diversified ride sharing patterns have been formed in China, and ride sharing relies increasingly on ride sharing websites. At present, office workers in large cities such as Beijing, Shanghai and Guangzhou are willing to find ride sharing partners from the ride sharing websites.

During ride sharing, a user needs to find a suitable vehicle owner according to her travel needs. Therefore, a driving route matching problem arises. The existing ride sharing platforms solve the driving route matching problem by using the following solution: calculating detouring distances and matching vehicle owner routes according to the detouring distances. This solution is disadvantageous in that all vehicle owner routes in a database need to be traversed for each matching, resulting in low matching efficiency.

SUMMARY

Embodiments of the present invention provide a driving route matching method and apparatus, and a storage medium, so as to improve the computing efficiency of driving route matching.

According to a first aspect, the embodiments of the present invention provide a driving route matching method, comprising:

obtaining a to-be-retrieved route, the to-be-retrieved route comprising a retrieval start point and a retrieval end point;

searching in a database of existing routes to select the existing routes passing through grids within a predetermined range around the retrieval start point as routes available for the start point;

searching in the database of the existing routes, to select the existing routes passing through grids within a predetermined range around the retrieval end point as routes available for the end point;

calculating intersections of the routes available for the start point and the routes available for the end point, and using routes in the intersections as candidate routes; and screening the candidate routes based on detouring distances.

According to a second aspect, the embodiments of the present invention also provide a driving route matching apparatus, comprising:

a to-be-retrieved route obtaining module, for obtaining a to-be-retrieved route, the to-be-retrieved route comprising a retrieval start point and a retrieval end point;

a first selecting module, for searching in a database of existing routes to select the existing routes passing through grids within a predetermined range around the retrieval start point as routes available for the start point;

a second selecting module, for searching in the database of the existing routes to select the existing routes passing through grids within a predetermined range around the retrieval end point as routes available for the end point;

an available route intersection module, for calculating intersections of the routes available for the start point and the routes available for the end point, and using routes in the intersections as candidate routes; and a first screening module, for screening the candidate routes based on detouring distances.

According to a third aspect, the embodiments of the present invention also provide a storage medium comprising computer-executable instructions, the computer-executable instructions being configured to, when executed by a computer processor, execute a driving route matching method, the method comprising the following steps:

obtaining a to-be-retrieved route, the to-be-retrieved route comprising a retrieval start point and a retrieval end point;

searching in a database of existing routes to select the existing routes passing through grids within a predetermined range around the retrieval start point as routes available for the start point;

searching in the database of the existing routes to select the existing routes passing through grids within a predetermined range around the retrieval end point as routes available for the end point;

calculating intersections of the routes available for the start point and the routes available for the end point, and using the routes in the intersections as candidate routes; and screening the candidate routes based on detouring distances.

The driving route matching method and apparatus and the storage medium that are provided in the embodiments of the present invention, by selecting, from a database of existing routes, the existing routes passing through grids within a predetermined range around a retrieval start point as routes available for the start point, selecting, from the database of existing routes, the existing routes passing through grids within a predetermined range around a retrieval end point as routes available for the end point, calculating intersections of the routes available for the start point and the routes available for the end point and using the routes in the intersections as candidate routes, and screening the candidate routes according to detouring distances, significantly improve the efficiency of driving route matching.

BRIEF DESCRIPTION OF THE DRAWINGS

To describe the technical solutions in the embodiments of the present invention more clearly, the drawings that need to be used in the embodiments are briefly introduced. It would be obvious that the drawings in the following description are merely some embodiments of the present invention, and those of ordinary skill in the art may further make modifications and replacements to these drawings without creative efforts.

DETAILED DESCRIPTION OF EMBODIMENTS

The technical solutions in the embodiments of the present invention will be described clearly and completely below with reference to the accompanying drawings. Apparently, the described embodiments are only some rather than all embodiments of the present invention, and are used for explaining the principle of the present invention, but are not intended to limit the present invention. On the basis of the embodiments in the present invention, all other embodiments acquired by those of ordinary skill in the art without creative efforts shall belong to the protection scope of the present invention.

First Embodiment

Figure 1:
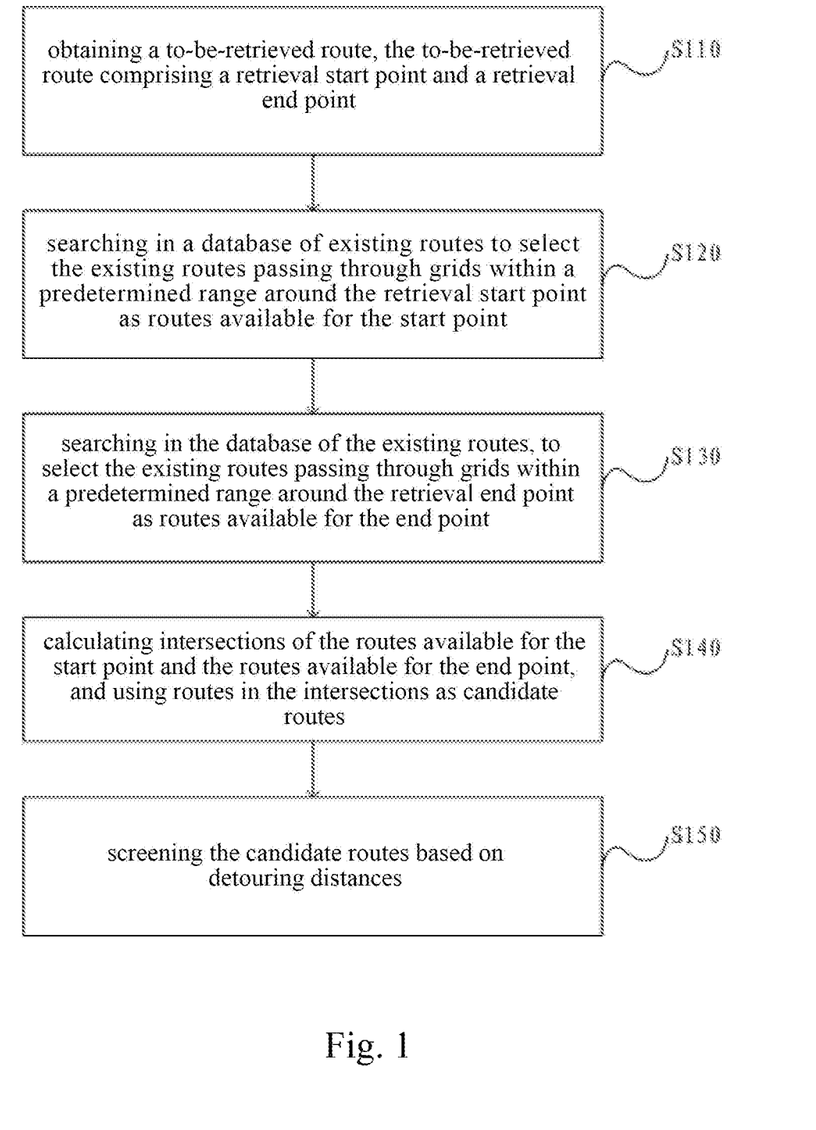
FIG. 1 is a flow chart of a driving route matching method according to a first embodiment of the present invention.

FIG. 1 is a flowchart of a driving route matching method according to a first embodiment of the present invention. The method is suitable for matching driving routes. The method may be executed by a driving route matching apparatus. The apparatus may be implemented by software and/or hardware. As shown in FIG. 1, the driving route matching method provided in this embodiment includes the following operations:

S110, obtaining a to-be-retrieved route, the to-be-retrieved route comprising a retrieval start point and a retrieval end point.

The above-mentioned operation is specifically as follows: A server obtains main information of the to-be-retrieved route, that is, the retrieval start point and the retrieval end point. Specifically, the retrieval start point and the retrieval end point may respectively be a start location and a destination location that are inputted by a user looking for a ride sharing vehicle.

S120, performing a search in a database of existing routes, and selecting the existing routes passing through grids within a predetermined range around the retrieval start point as routes available for the start point.

In this embodiment, the grids are rectangular blocks that are formed by dividing a map in the form of grids using a GeoHash algorithm. The hash codes correspond to the grids and are stored in a hash list, and the hash codes of neighboring grids are associated with each other in the hash list.

The above-mentioned operation specifically includes:

The server determines, according to the obtained retrieval start point, a hash code of the grid where the retrieval start point is located, and matches the hash code of the retrieval start point against the database of existing routes; obtains, from the hash list, a preset number of hash codes neighboring to the matching hash code, as grids within a start point range; and uses the existing routes passing through the grids within the start point range as the routes available for the start point.

When the hash code of the retrieval start point is matched against the database of existing routes, if the hash code of the retrieval start point is the same as or corresponds to a hash code in the database of existing routes, it indicates that the matching is successful. A corresponding hash code may refer to a hash code having the same prefix as the hash code of the retrieval start point.

Because the hash codes of neighboring grids are associated with each other in the hash list, a preset number of associated hash codes may be obtained from the hash list, the grids corresponding to these hash codes being neighboring grids.

S130, performing a search in the database of the existing routes, and selecting the existing routes passing through grids within a predetermined range around the retrieval end point as routes available for the end point.

Similar to the method for determining the routes available for the start point, the above-mentioned operation is specifically: first determining a hash code of the retrieval end point, and matching the hash code of the retrieval endpoint against the database of existing routes; obtaining, from the hash list, a preset number of hash codes neighboring to the matching hash code, as grids within an end point range; and using the existing routes passing through the grids within the end point range as the routes available for the end point.

It should be noted that in this embodiment, the database of existing routes is an inverted index database, the inverted index database stores records of the existing routes, the existing routes are sorted according to an order of values of at least one attribute in the records, and the attribute comprises at least a start point hash code, an end point hash code, and/or an intermediate point hash code.

S140, calculating intersections of the routes available for the start point and the routes available for the end point, and using the routes in the intersections as candidate routes.

Further, among the routes available for the start point and the routes available for the end point, the existing routes that pass through the retrieval start point and pass through the grids within the predetermined range around the retrieval end point may be used as the candidate routes, that is, the routes that are both the routes available for the start point and the routes available for the end point may be used as the candidate routes.

S150, screening the candidate routes according to detouring distances.

Figure 2:
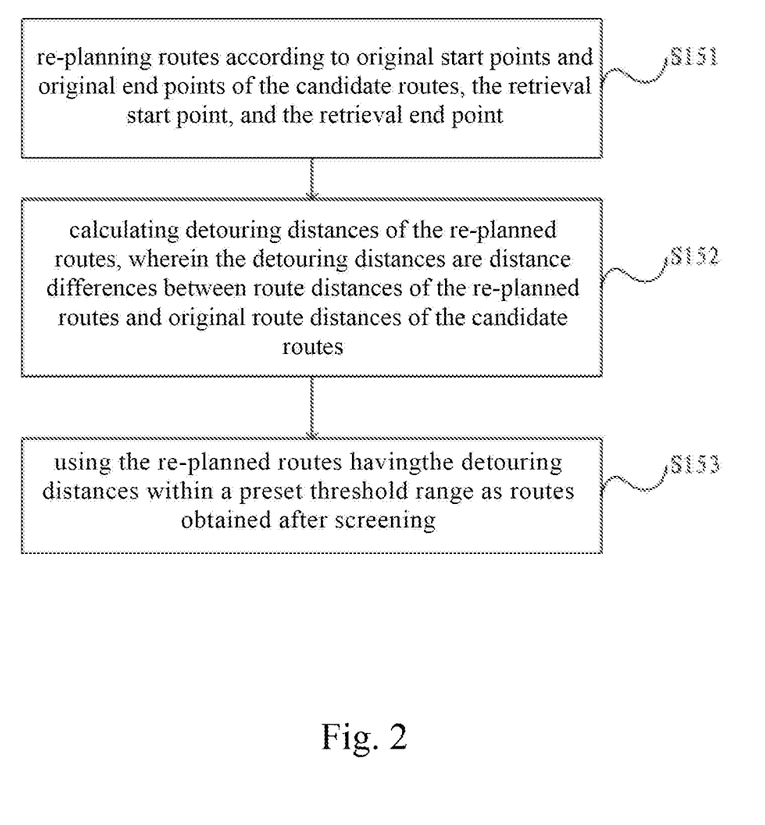
FIG. 2 is a flow chart of screening in the driving route matching method according to the first embodiment of the present invention.

Referring to FIG. 2, the above-mentioned operation may specifically include the following operations:

S151, re-planning routes according to original start points and original end points of the candidate routes, the retrieval start point, and the retrieval end point.

If the original start points, the original end points, the retrieval start point and the retrieval endpoint are passed through in different orders, the detouring distance varies greatly. Therefore, the candidate routes needs to be further optimized.

S152, calculating detouring distances of the re-planned routes, wherein the detouring distances are distance differences between route distances of the re-planned routes and original route distances of the candidate routes.

The original route distance is the distance of a preferable route from the original start point to the original end point. The preferable route may be a route that requires the shortest time, has good road conditions, gives priority to highways, avoids congestion, and/or has the shortest distance. These attributes of the route may be stored in a database as attributes of the existing routes, and may also be updated in real time.

S153, using the re-planned routes of which the detouring distances fall within a preset threshold range as routes obtained after screening.

Further, a preset threshold of the detouring distance may be determined by the vehicle owner, and may be a specific distance value that is set, or may be a preferable route selected from the re-planned routes. During route screening, in addition to the detouring distance, factors such as time consumption, road conditions, and highway toll information of the re-planned routes may also be considered.

According to the driving route matching method provided in this embodiment of the present invention, the existing routes are stored in an inverted index manner in the database of existing routes, and the existing routes are sorted according to an order of values of attributes, such as start point hash codes, end point hash codes, and/or intermediate point hash codes, in the existing routes. In this way, the route search efficiency of users that needs a ride is improved, the detouring distance is reduced to a certain extent for vehicle owners, and time is saved, thereby improving the matching efficiency and experience of the user and vehicle owner.

According to the technical solution in this embodiment of the present invention, preferably, after the screening the candidate routes according to detouring distances, the method may further include: sorting the routes obtained after screening, according to time points of departure of vehicle owners corresponding to the existing routes.

That is, the routes obtained after screening are sorted according to time points of departure from the original start points of the routes, and may be displayed in chronological order of time points of departure. Preferably, the routes obtained after screening may alternatively be sorted according to estimated time points of arrival at the retrieval start point, and displayed in chronological order of estimated time points of arrival. The two different sorting methods allow the user to select a suitable time point according to the time points of departure or the estimated time points of arrival, thus properly arrange his/her schedule.

Preferably, the driving route matching method of this embodiment further includes:

screening the candidate routes according to an auxiliary route requirement of a user, wherein the auxiliary route requirement includes: the number of years of driving experience of a driver, or a vehicle model.

The auxiliary route requirement is not limited to the above-mentioned two items, and may further include: a vehicle owner identification (ID) obtained by the vehicle owner during registration, the gender of the vehicle owner, and so on. In this technical solution, the auxiliary route requirement may be stored in the database of existing routes as an attribute of the records of the existing routes. Preferably, the stored auxiliary route requirement may be updated in real time.

In this technical solution, alternatively, the candidate routes are screened according to at least one item in the auxiliary route requirement, and then screened according to the retrieval start point and the retrieval end point of the to-be-retrieved route. In this way, different screening results are obtained in the retrieval process, thereby improving user experience.

For example, a retrieval may be performed according to an auxiliary route requirement that requires vehicle owners to have at least three years of driving experience. Accordingly, all vehicle owners meeting this requirement in the database of existing routes as well as related information about these vehicle owners can be found. The related information includes the route, gender, vehicle owner ID, etc. of the vehicle owner meeting this requirement.

Second Embodiment

Figure 3:
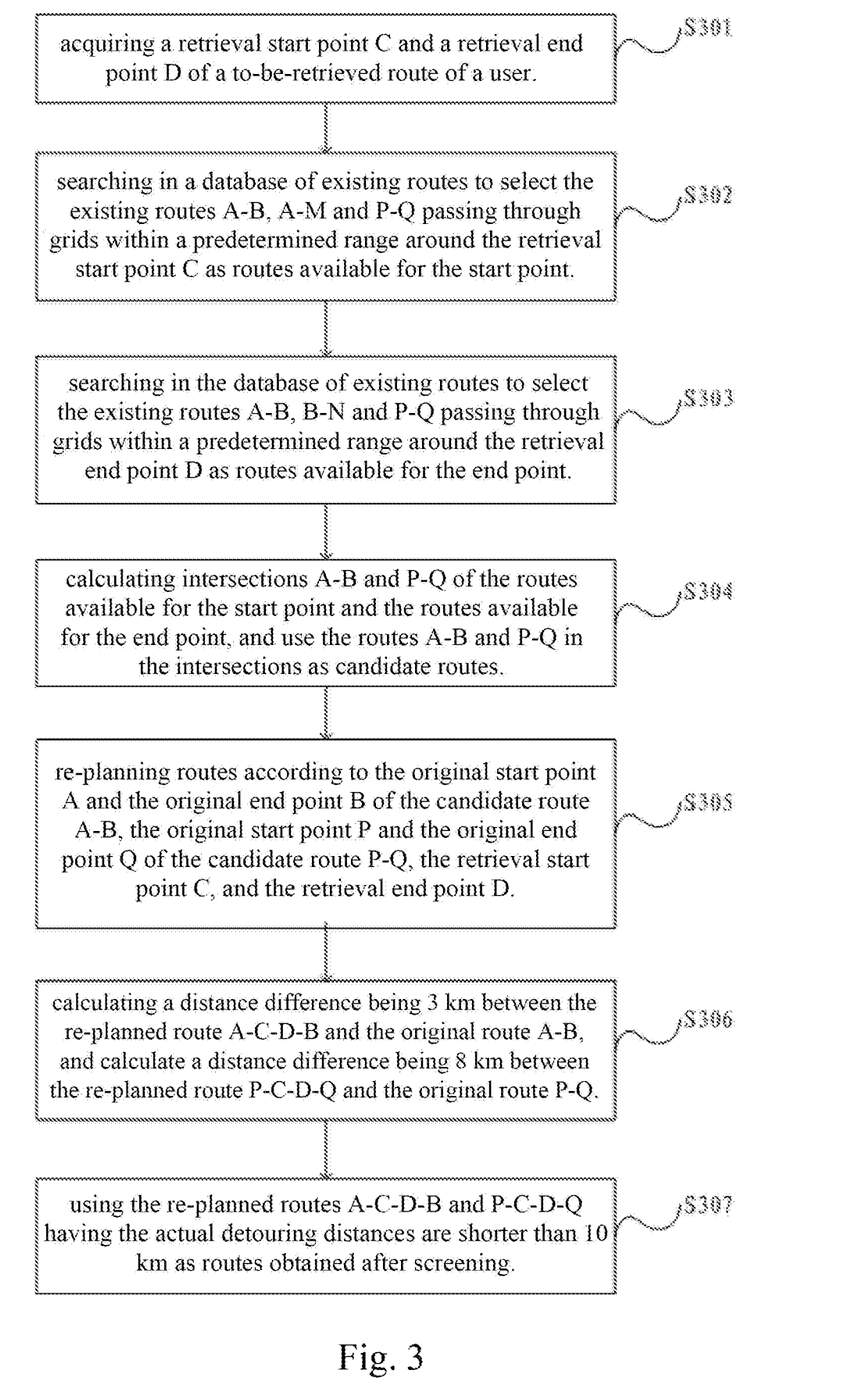
FIG. 3 is a flow chart of a driving route matching method according to a second embodiment of the present invention.
Figure 4:
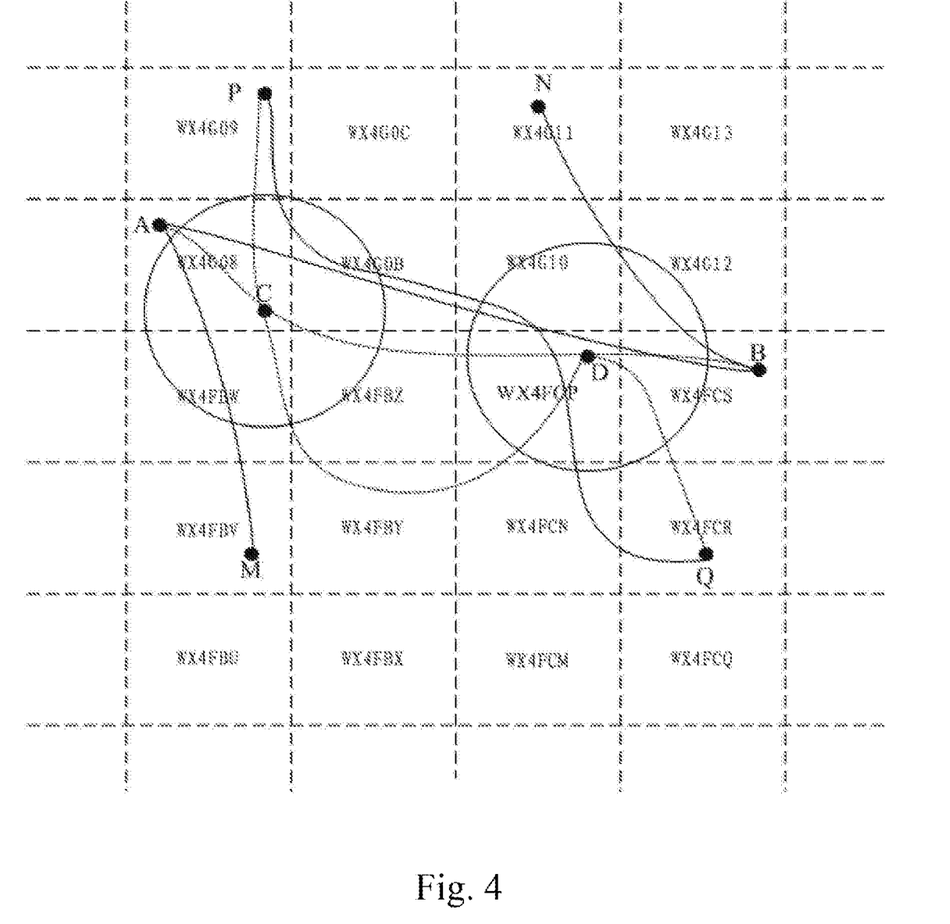
FIG. 4 is a schematic diagram of the driving route matching method according to the second embodiment of the present invention.

FIG. 3 is a flow chart of a driving route matching method according to a second embodiment of the present invention. FIG. 4 is a schematic diagram of the driving route matching method according to the second embodiment of the present invention. This embodiment exemplarily describes the technical solution in the above-mentioned embodiment. As shown in FIG. 4, a user want to take a ride at location C, and the destination is location D. In this case, the driving route matching method includes the following operations as shown in FIG. 3:

S301, acquiring a retrieval start point C and a retrieval end point D of a to-be-retrieved route of a user.

S302, performing a search in a database of existing routes, and selecting the existing routes A-B, A-M and P-Q passing through grids within a predetermined range around the retrieval start point C as routes available for the start point.

Locations on a map are divided in the above-mentioned grid form, the hash codes correspond to the grids and are stored in a hash list, and the hash codes of neighboring grids are associated with each other in the hash list, making it convenient to find a particular number of neighboring grids.

As shown in FIG. 4, the above-mentioned operation is specifically: determining that a hash code of the retrieval start point is WX4G08, and matching WX4G08 against the database of existing routes; obtaining, from the hash list, a preset number of hash codes WX4G08, WX4G08, WX4FBW and WX4FBZ neighboring to the matching hash code WX4G08, as grids within a start point range; and using the existing routes A-B, A-M and P-Q passing through the grids within the start point range as the routes available for the start point.

S303, performing a search in the database of existing routes, and selecting the existing routes A-B, B-N and P-Q passing through grids within a predetermined range around the retrieval end point D as routes available for the end point.

The above-mentioned operation may specifically be: first a hash code WX4FCP of the retrieval end point, and matching WX4FCP against the database of existing routes; then, obtaining, from the hash list, a preset number of hash codes WX4G10, WX4FBZ, WX4FCN and WX4FCS neighboring to the matching hash code WX4FCP, as grids within an end point range; and using the existing routes A-B, B-N and P-Q passing through the grids within the end point range as the routes available for the end point.

S304, calculating intersections A-B and P-Q of the routes available for the start point and the routes available for the end point, and using the routes A-B and P-Q in the intersections as candidate routes.

S305, re-planning routes according to the original start point A and the original end point B of the candidate route A-B, the original start point P and the original end point Q of the candidate route P-Q, the retrieval start point C, and the retrieval end point D.

S306, calculating a distance difference being 3 km between the re-planned route A-C-D-B and the original route A-B, and calculating a distance difference being 8 km between the re-planned route P-C-D-Q and the original route P-Q.

S307, using the re-planned routes A-C-D-B and P-C-D-Q of which the actual detouring distances are shorter than 10 km as routes obtained after screening.

According to the technical solution provided in this embodiment, information about the start points and main intermediate points of the existing routes is stored as an attribute, making it convenient for a ride sharing passenger on the existing routes to search for routes; and the actual detouring distances are calculated and compared, allowing the passenger to select a more suitable route.

Third Embodiment

Figure 5:
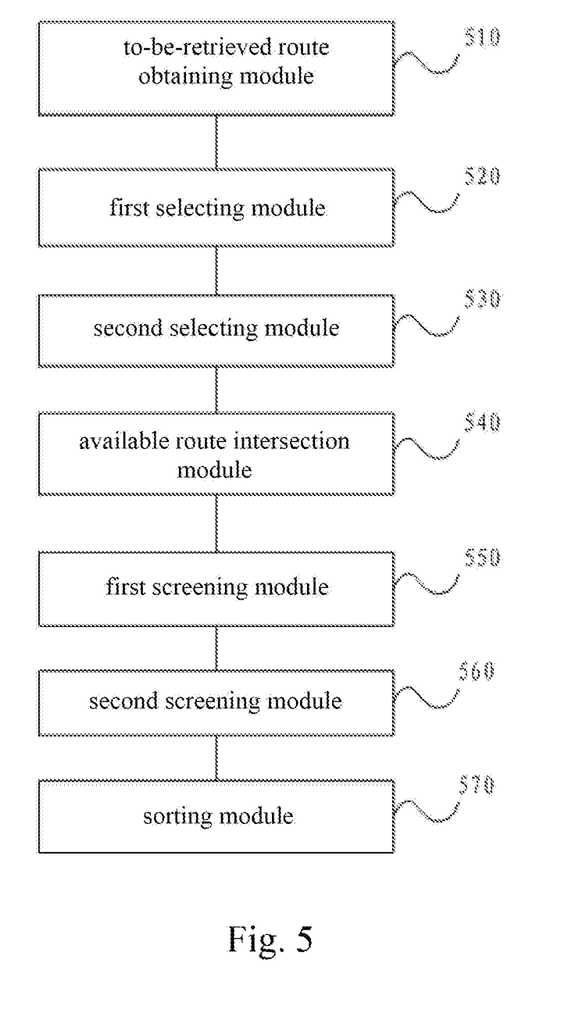
FIG. 5 is a schematic structural diagram of a driving route matching apparatus according to a third embodiment of the present invention.

FIG. 5 is a schematic structural diagram of a driving route matching apparatus according to a third embodiment of the present invention. As shown in FIG. 5, the driving route matching apparatus includes: a to-be-retrieved route obtaining module 510, a first selecting module 520, a second selecting module 530, an available route intersection module 540, and a first screening module 550.

The to-be-retrieved route obtaining module 510 is used for obtaining a to-be-retrieved route, the to-be-retrieved route comprising a retrieval start point and a retrieval end point.

The first selecting module 520 is used for performing a search in a database of existing routes, and selecting the existing routes passing through grids within a predetermined range around the retrieval start point as routes available for the start point.

The second selecting module 530 is used for performing a search in the database of the existing routes, and selecting the existing routes passing through grids within a predetermined range around the retrieval end point as routes available for the end point.

The available route intersection module 540 is used for calculating intersections of the routes available for the start point and the routes available for the end point, and using the routes in the intersections as candidate routes.

The first screening module 550 is used for screening the candidate routes according to detouring distances.

In the above-mentioned apparatus, the database of existing routes is an inverted index database, the inverted index database stores records of the existing routes, the existing routes are sorted according to an order of values of at least one attribute in the records, and the attribute comprises at least a start point hash code and an end point hash code.

Preferably, a map is divided in the form of grids, the hash codes correspond to the grids and are stored in a hash list, and the hash codes of neighboring grids are associated with each other in the hash list.

In addition, the first selecting module 520 is specifically used for: determining a hash code of the retrieval start point, and matching the hash code of the retrieval start point against the database of existing routes; obtaining, from the hash list, a preset number of hash codes neighboring to the matching hash code, as grids within a start point range; and using the existing routes passing through the grids within the start point range as the routes available for the start point.

The second selecting module 530 is specifically used for: determining a hash code of the retrieval end point, and matching the hash code of the retrieval end point against the database of existing routes; obtaining, from the hash list, a preset number of hash codes neighboring to the matching hash code, as grids within an endpoint range; and using the existing routes passing through the grids within the end point range as the routes available for the end point.

Further, the first screening module 550 includes: a route planning submodule, a detouring distance calculating submodule, and a route determining submodule.

The route planning submodule is used for re-planning routes according to original start points and original end points of the candidate routes, the retrieval start point, and the retrieval end point.

the detouring distance calculating submodule is used for calculating detouring distances of the re-planned routes, wherein the detouring distances are distance differences between route distances of the re-planned routes and original route distances of the candidate routes.

The route determining submodule is used for using the re-planned routes of which the detouring distances fall within a preset threshold range as routes obtained after screening.

In this embodiment, the apparatus further includes: a second screening module 560.

The second screening module 560 is used for screening the candidate routes according to an auxiliary route requirement of a user after the candidate routes are screened according to the detouring distances, wherein the auxiliary route requirement includes: the number of years of driving experience of a driver, or a vehicle model.

In this embodiment, the apparatus further includes: a sorting module 570.

The sorting module 570 is used for sorting the routes obtained after screening, according to time points of departure of vehicle owners corresponding to the existing routes, after the candidate routes are screened according to the detouring distances.

The above-mentioned driving route matching apparatus can execute the driving route matching method that is provided in any embodiment of the present invention, and has functional modules and beneficial effects corresponding to the executed method.

Fourth Embodiment

A storage medium including computer-executable instructions, the computer-executable instructions being configured to, when executed by a computer processor, execute a driving route matching method, the method comprising the following steps:

obtaining a to-be-retrieved route, the to-be-retrieved route comprising a retrieval start point and a retrieval end point;

performing a search in a database of existing routes, and selecting the existing routes passing through grids within a predetermined range around the retrieval start point as routes available for the start point;

performing a search in the database of the existing routes, and selecting the existing routes passing through grids within a predetermined range around the retrieval end point as routes available for the end point;

calculating intersections of the routes available for the start point and the routes available for the end point, and using the routes in the intersections as candidate routes; and screening the candidate routes according to detouring distances.

When the above-mentioned storage medium executes the method, the method may further include:

the database of existing routes is an inverted index database, the inverted index database stores records of the existing routes, the existing routes are sorted according to an order of values of at least one attribute in the records, and the attribute comprises at least a start point hash code and an end point hash code.

When the above-mentioned storage medium executes the method, the method may further include:

a map is divided in the form of grids, the hash codes correspond to the grids and are stored in a hash list, and the hash codes of neighboring grids are associated with each other in the hash list;

the performing a search in a database of existing routes, and selecting the existing routes passing through grids within a predetermined range around the retrieval start point as routes available for the start point includes:

determining a hash code of the retrieval start point, and matching the hash code of the retrieval start point against the database of existing routes; obtaining, from the hash list, a preset number of hash codes neighboring to the matching hash code, as grids within a start point range; and using the existing routes passing through the grids within the start point range as the routes available for the start point;

the performing a search in the database of the existing routes, and selecting the existing routes passing through grids within a predetermined range around the retrieval end point as routes available for the end point includes:

determining a hash code of the retrieval end point, and matching the hash code of the retrieval end point against the database of existing routes; obtaining, from the hash list, a preset number of hash codes neighboring to the matching hash code, as grids within an endpoint range; and using the existing routes passing through the grids within the end point range as the routes available for the end point.

When the above-mentioned storage medium executes the method, the screening the candidate routes according to detouring distances may specifically further include:

re-planning routes according to original start points and original end points of the candidate routes, the retrieval start point, and the retrieval end point;

calculating detouring distances of the re-planned routes, wherein the detouring distances are distance differences between route distances of the re-planned routes and original route distances of the candidate routes; and using the re-planned routes of which the detouring distances fall within a preset threshold range as routes obtained after screening.

When the above-mentioned storage medium executes the method, after the screening the candidate routes according to detouring distances, the method may further include:

screening the candidate routes according to an auxiliary route requirement of a user, wherein the auxiliary route requirement includes: the number of years of driving experience of a driver, or a vehicle model.

When the above-mentioned storage medium executes the method, after the screening the candidate routes according to detouring distances, the method may further include:

sorting the routes obtained after screening, according to time points of departure of vehicle owners corresponding to the existing routes.

Through the description of the foregoing implementations, those skilled in the art may clearly understand that the present invention may be implemented by software plus necessary general-purpose hardware, and definitely may also be implemented all by hardware, but in most cases, the former implementation is preferred. Based on such an understanding, the technical solutions in the present invention essentially, or the part contributing to the prior art may be embodied in the form of a software product. The computer software product may be stored in a computer-readable storage medium, such as a magnetic disk, an optical disc, a read-only memory (ROM), or a random access memory (RAM), and includes several instructions for instructing a computer device (which may be a personal computer, a server, a network device, or the like) to perform the method described in the embodiments of the present invention.

It should be noted that in the above-mentioned embodiment of the driving route matching apparatus, the units and modules included are divided according to functional logic, but the present invention is not limited to the above-mentioned division manner as long as corresponding functions can be implemented. In addition, specific names of the functional modules are only for differentiating purposes and are not used to limit the protection scope of the present invention.

The above descriptions are merely specific implementations of the present invention, but the protection scope of the present invention is not limited thereto. Any variations or replacements that can be easily conceived of by those skilled in the art within the technical scope disclosed by the present invention shall be encompassed by the protection scope of the present invention. Therefore, the protection scope of the present invention shall be subject to the protection scope of the claims.

What is claimed is:

1. A driving route matching method, comprising:
    obtaining, by a server, a to-be-retrieved route, the to-be-retrieved route comprising a retrieval start point and a retrieval end point;
    searching, by the server, in a database of existing routes to select the existing routes passing through grids within a predetermined range around the retrieval start point as routes available for the start point;
    searching, by the server, in the database of the existing routes, to select the existing routes passing through grids within a predetermined range around the retrieval end point as routes available for the end point;
    calculating, by the server, intersections of the routes available for the start point and the routes available for the end point, and using routes in the intersections as candidate routes; and
    screening, by the server, the candidate routes based on detouring distances.

2. The method according to claim 1, wherein the database of existing routes is an inverted index database, the inverted index database stores records of each of the existing routes, the existing routes are sorted according to an order of values of at least one attribute in the records, and the attribute comprises at least a start point hash code and an end point hash code.

3. The method according to claim 2, wherein a map is divided into grids, the hash codes correspond to the grids and are stored in a hash list, and the hash codes of neighboring grids are associated with each other in the hash list;
    the searching in a database of existing routes to select the existing routes passing through grids within a predetermined range around the retrieval start point as routes available for the start point comprises:
        determining a hash code of the retrieval start point, and matching the hash code of the retrieval start point among the database of existing routes; obtaining, from the hash list, a preset number of hash codes neighboring to the matching hash code, as grids within a start point range; and using the existing routes passing through the grids within the start point range as the routes available for the start point; and
    the searching in the database of the existing routes to select the existing routes passing through grids within a predetermined range around the retrieval end point as routes available for the end point comprises:

determining a hash code of the retrieval end point, and matching the hash code of the retrieval end point among the database of existing routes; obtaining, from the hash list, a preset number of hash codes neighboring to the matching hash code, as grids within an end point range; and using the existing routes passing through the grids within the end point range as the routes available for the end point.

4. The method according to claim 1, wherein the screening, by the server, the candidate routes based on detouring distances comprises:
   re-planning, by the server, routes according to original start points and original end points of the candidate routes, the retrieval start point, and the retrieval end point;
   calculating, by the server, detouring distances of the re-planned routes, wherein the detouring distances are distance differences between route distances of the re-planned routes and original route distances of the candidate routes; and
   using, by the server, the re-planned routes having the detouring distances within a preset threshold range as routes obtained after screening.

5. The method according to claim 1, wherein after the screening, by the server, the candidate routes based on detouring distances, the method further comprises:
   screening, by the server, the candidate routes based on an auxiliary route requirement of a user, wherein the auxiliary route requirement comprises: driving ages of drivers, or vehicle models.

6. The claim according to claim 1, wherein after the screening, by the server, the candidate routes based on detouring distances, the method further comprises:
   sorting, by the server, the routes obtained after screening, based on departure times of drives corresponding to the existing routes.

7. A driving route matching apparatus, comprising:
   a to-be-retrieved route obtaining module, for obtaining a to-be-retrieved route, the to-be-retrieved route comprising a retrieval start point and a retrieval end point;
   a first selecting module, for searching in a database of existing routes to select the existing routes passing through grids within a predetermined range around the retrieval start point as routes available for the start point;
   a second selecting module, for searching in the database of the existing routes to select the existing routes passing through grids within a predetermined range around the retrieval end point as routes available for the end point;
   an available route intersection module, for calculating intersections of the routes available for the start point and the routes available for the end point, and using routes in the intersections as candidate routes; and
   a first screening module, for screening the candidate routes based on detouring distances.

8. The apparatus according to claim 7, wherein the database of existing routes is an inverted index database, the inverted index database stores records of each of the existing route, the existing routes are sorted according to an order of values of at least one attribute in the records, and the attribute comprises at least a start point hash code and an end point hash code.

9. The apparatus according to claim 8, wherein a map is divided into grids, the hash codes correspond to the grids and are stored in a hash list, and the hash codes of neighboring grids are associated with each other in the hash list;

the first selecting module is specifically used for:
   determining a hash code of the retrieval start point, and matching the hash code of the retrieval start point among the database of existing routes; obtaining, from the hash list, a preset number of hash codes neighboring to the matching hash code, as grids within a start point range; and using the existing routes passing through the grids within the start point range as the routes available for the start point; and
the second selecting module is specifically used for:
   determining a hash code of the retrieval end point, and matching the hash code of the retrieval end point among the database of existing routes; obtaining, from the hash list, a preset number of hash codes neighboring to the matching hash code, as grids within an end point range; and using the existing routes passing through the grids within the end point range as the routes available for the end point.

10. The apparatus according to claim 7, wherein the first screening module comprises:
    a route planning submodule, for re-planning routes according to original start points and original end points of the candidate routes, the retrieval start point, and the retrieval end point;
    a detouring distance calculating submodule, for calculating detouring distances of the re-planned routes, wherein the detouring distances are distance differences between route distances of the re-planned routes and original route distances of the candidate routes; and
    a route determining submodule, for using the re-planned routes having the detouring distances within a preset threshold range as routes obtained after screening.

11. The apparatus according to claim 7, wherein the apparatus further comprises:
    a second screening module, for screening the candidate routes based on an auxiliary route requirement of a user after the candidate routes are screened according to the detouring distances, wherein the auxiliary route requirement comprises: driving ages of drivers, or vehicle models.

12. The apparatus according to claim 7, wherein the apparatus further comprises:
    a sorting module, for sorting the routes obtained after screening, based on departure times of drives corresponding to the existing routes, after the candidate routes are screened based on the detouring distances.

13. A non-transitory computer storage medium storing a computer program, which when executed by one or more processors, cause the one or more processors to perform operations, the operations comprising the steps of:
    obtaining a to-be-retrieved route, the to-be-retrieved route comprising a retrieval start point and a retrieval end point;
    searching in a database of existing routes to select the existing routes passing through grids within a predetermined range around the retrieval start point as routes available for the start point;
    searching in the database of the existing routes to select the existing routes passing through grids within a predetermined range around the retrieval end point as routes available for the end point;
    calculating intersections of the routes available for the start point and the routes available for the end point, and using the routes in the intersections as candidate routes; and
    screening the candidate routes based on detouring distances.

14. An apparatus for driving route matching, wherein the apparatus comprises:
- at least one processor; and
- a memory storing instructions;
- wherein the at least one processor is configured to execute the instructions to:
- obtain a to-be-retrieved route, the to-be-retrieved route comprising a retrieval start point and a retrieval end point;
- search in a database of existing routes to select the existing routes passing through grids within a predetermined range around the retrieval start point as routes available for the start point;
- search in the database of the existing routes, to select the existing routes passing through grids within a predetermined range around the retrieval end point as routes available for the end point;
- calculate intersections of the routes available for the start point and the routes available for the end point, and use routes in the intersections as candidate routes; and
- screen the candidate routes based on detouring distances.

15. The method according to claim 2, wherein after the screening the candidate routes based on detouring distances, the method further comprises screening the candidate routes based on an auxiliary route requirement of a user, wherein the auxiliary route requirement comprises: driving ages of drivers, or vehicle models.

16. The method according to claim 3, wherein after the screening the candidate routes based on detouring distances, the method further comprises screening the candidate routes based on an auxiliary route requirement of a user, wherein the auxiliary route requirement comprises: driving ages of drivers, or vehicle models.

17. The claim according to claim 2, wherein after the screening the candidate routes based on detouring distances, the method further comprises:
- sorting the routes obtained after screening, based on departure times of drives corresponding to the existing routes.

18. The claim according to claim 3, wherein after the screening the candidate routes based on detouring distances, the method further comprises:
- sorting the routes obtained after screening, based on departure times of drives corresponding to the existing routes.

19. The apparatus according to claim 8, wherein the apparatus further comprises: a second screening module, for screening the candidate routes based on an auxiliary route requirement of a user after the candidate routes are screened according to the detouring distances, wherein the auxiliary route requirement comprises: driving ages of drivers, or vehicle models.

20. The apparatus according to claim 9, wherein the apparatus further comprises: a second screening module, for screening the candidate routes based on an auxiliary route requirement of a user after the candidate routes are screened according to the detouring distances, wherein the auxiliary route requirement comprises: driving ages of drivers, or vehicle models.

* * * * *